United States Patent
Kane (10) Patent No.: US 12,020,724 B2
(45) Date of Patent: *Jun. 25, 2024

(54) METHODS AND SYSTEMS FOR AUDIO SAMPLE QUALITY CONTROL

(71) Applicant: Clearspeed Inc., San Diego, CA (US)

(72) Inventor: James A. Kane, Wellington, FL (US)

(73) Assignee: Clearspeed Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,794

(22) Filed: Jun. 16, 2022

(65) Prior Publication Data
US 2023/0033305 A1    Feb. 2, 2023

Related U.S. Application Data

(63) Continuation of application No. 17/139,741, filed on Dec. 31, 2020, now Pat. No. 11,386,919.

(51) Int. Cl.
*G10L 25/60* (2013.01)
*G10L 25/63* (2013.01)
*G10L 25/84* (2013.01)
*H04M 3/22* (2006.01)

(52) U.S. Cl.
CPC ............ *G10L 25/60* (2013.01); *G10L 25/63* (2013.01); *G10L 25/84* (2013.01); *H04M 3/2227* (2013.01); *H04M 3/2236* (2013.01)

(58) Field of Classification Search
None
See application file for complete search history.

(56) References Cited

U.S. PATENT DOCUMENTS

| | | | |
|---|---|---|---|
| 8,612,235 B2 | 12/2013 | Braho et al. | |
| 9,236,050 B2 | 1/2016 | DiGregorio | |
| 11,386,919 B1* | 7/2022 | Kane | G10L 25/63 |
| 2010/0100381 A1* | 4/2010 | Cohen | G10L 25/69 |
| | | | 704/251 |
| 2010/0250257 A1* | 9/2010 | Hirose | G10L 13/033 |
| | | | 704/E21.001 |
| 2013/0266925 A1* | 10/2013 | Nunamaker, Jr. | G09B 7/00 |
| | | | 434/362 |
| 2015/0254566 A1 | 9/2015 | Chandramouli et al. | |
| 2017/0178627 A1* | 6/2017 | Firby | G10L 15/22 |
| 2017/0187880 A1* | 6/2017 | Raanani | H04M 3/5232 |
| 2019/0104280 A1 | 4/2019 | Bastide et al. | |
| 2019/0109804 A1* | 4/2019 | Fu | G10L 25/51 |
| 2019/0392852 A1* | 12/2019 | Hijazi | H04N 21/2335 |

OTHER PUBLICATIONS

U.S. Appl. No. 17/139,741 Final Office Action dated Aug. 17, 2021.
U.S. Appl. No. 17/139,741 Notice of Allowance dated Mar. 9, 2022.
U.S. Appl. No. 17/139,741 Office Action dated Apr. 28, 2021.

\* cited by examiner

*Primary Examiner* — Antim G Shah
(74) *Attorney, Agent, or Firm* — WILSON SONSINI GOODRICH & ROSATI (57) ABSTRACT

The present disclosure provides methods and systems that may be used for providing quality control for audio samples. The audio samples may be speech samples of a user. The user may be participating in an audio interview.

19 Claims, 6 Drawing Sheets

METHODS AND SYSTEMS FOR AUDIO SAMPLE QUALITY CONTROL

CROSS-REFERENCE

This application is a continuation of U.S. patent application of U.S. patent application Ser. No. 17/139,741, filed Dec. 31, 2020, which is incorporated herein by reference in its entirety.

BACKGROUND

Speech processing is increasingly used across many industries and in many applications. For example, speech processing may be used to transcribe speech, control a personal computing device, diagnose a patient with a health condition, detect dishonesty, or predict a person's risk with respect to an event or a function. Speech processing algorithms may be most effective when provided with quality, noise-free speech samples.

SUMMARY

The present disclosure provides methods and systems for performing, in real-time, automated quality control of speech samples. The quality control system described herein can determine, among other things, whether the speech in a speech sample (1) is responsive to a query, (2) is the appropriate volume, (3) is the appropriate cadence, and (4) contains background noise. These factors may impact the ability of speech processing algorithms to effectively analyze the speech sample. The automated quality control system can, in real time, improve the likelihood of a user generating a usable speech sample by providing specific feedback to the user regarding the quality of the speech sample. Use of the automated quality control system described herein may reduce the likelihood of a speech processing algorithm failing to properly process a speech sample due to the speech sample's quality, improving the efficacy of the speech processing algorithm. This may reduce or prevent the need to collect second speech samples. Additionally, providing specific, real-time feedback to a user regarding the quality of the user's speech sample may be unconventional. Other systems may instead rely on post-processing or manual human review of speech samples.

In an aspect, the present disclosure provides a computer-implemented method, comprising: (a) obtaining a first speech sample from a user; (b) determining that the speech sample does not satisfy at least one quality control requirement of a plurality of quality control requirements selected from the group consisting of a missing response, vocal volume, speed, and a presence or absence of background noise, wherein each quality control requirement of the plurality of quality control requirements is associated with an instruction that indicates (i) that the quality control requirement was not satisfied, and (ii) how to satisfy the quality control requirement in a second speech sample; (c) providing the instruction associated with the quality control requirement to the user; and (d) prompting the user to provide the second speech sample.

In some embodiments, each quality control requirement of the plurality of quality control requirements is associated with a different priority rating. In some embodiments, the method further comprises determining that the first speech sample does not satisfy two or more quality control requirements of the plurality of quality control requirements and providing the instruction associated with a highest priority rating of the different priority ratings. In some embodiments, the quality control requirements have a priority rating, from highest to lowest, of a missing response, too low of vocal volume, too fast of a response, to slow of a response, too loud of a response, and a presence of background noise. In some embodiments, the method further comprises repeating (a)-(d) to prompt the user to provide a third speech sample. In some embodiments, (a)-(d) is repeated less than three times. In some embodiments, the method further comprises repeating (a)-(c) for the second speech sample. In some embodiments, where the second speech sample is determined not to satisfy the at least one quality control requirement, the second speech sample is discarded. In some embodiments, the first speech sample is a portion of an automated interview. In some embodiments, the automated interview is an automated telephone interview. In some embodiments, the automated interview is configured to determine a level of risk of the user. In some embodiments, where the first speech sample is determined to satisfy the at least one quality control requirement, skipping (c) and (d). In some embodiments, the determining is performed in real-time. In some embodiments, the providing the instruction comprises providing an auditory instruction to the user. In some embodiments, the first speech sample is less than 5 seconds long. In some embodiments, (b) further comprises determining that the first speech sample satisfies each quality control requirement of the plurality of quality control requirements.

In another aspect, the present disclosure provides a system, comprising: one or more computer processors operatively coupled to computer memory, wherein the one or more computer processors are individually or collectively configured to (a) determine that a first speech sample of a user does not satisfy at least one quality control requirement of a plurality of quality control requirements selected from the group consisting of a missing response, vocal volume, vocal speed, and a presence or absence of background noise, wherein each quality control requirement of the plurality of quality control requirements is associated with an instruction that indicates: (i) that the quality control requirement was not satisfied, and (ii) how to satisfy the quality control requirement in a second speech sample; (b) provide the instruction associated with the quality control requirement to the user; and (c) prompt the user to provide the second speech sample.

In another aspect, the present disclosure provides one or more non-transitory computer storage media storing instructions that are operable, when executed by one or more computers, to cause the one or more computers to perform operations comprising (a) obtaining a first speech sample from a user; (b) determining that the first speech sample satisfies at least one quality control requirement of a plurality of quality control requirements selected from the group consisting of a missing response, vocal volume, vocal speed, and a presence or absence of background noise, wherein each quality control requirement of the plurality of quality control requirements is associated with an instruction that indicates (i) that the quality control requirement was not satisfied, and (ii) how to satisfy the quality control requirement in a second speech sample; (c) providing the instruction associated with the quality control requirement to the user; and (d) prompting the user to provide the second speech sample.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

In an aspect, the present disclosure provides a computer-implemented method. The computer-implemented method may comprise obtaining a first speech sample from a user. The speech sample may be determined to not satisfy at least one quality control requirement of a plurality of quality control requirements. The plurality of quality control requirements may comprise a missing response, a vocal volume, a vocal speed, and a presence or absence of background noise. Each quality control requirement of the plurality of quality control requirements may be associated with instructions. The instructions may indicate that the quality control requirement was not satisfied. The instructions may indicate how to satisfy the quality control requirement in a second speech sample. The instruction associated with the quality control requirement may be provided to the user. The user may be prompted to provide the second speech sample. Though described herein with respect to the method, the following may be applied to systems and non-transitory computer readable instructions as described elsewhere herein.

Figure 1:
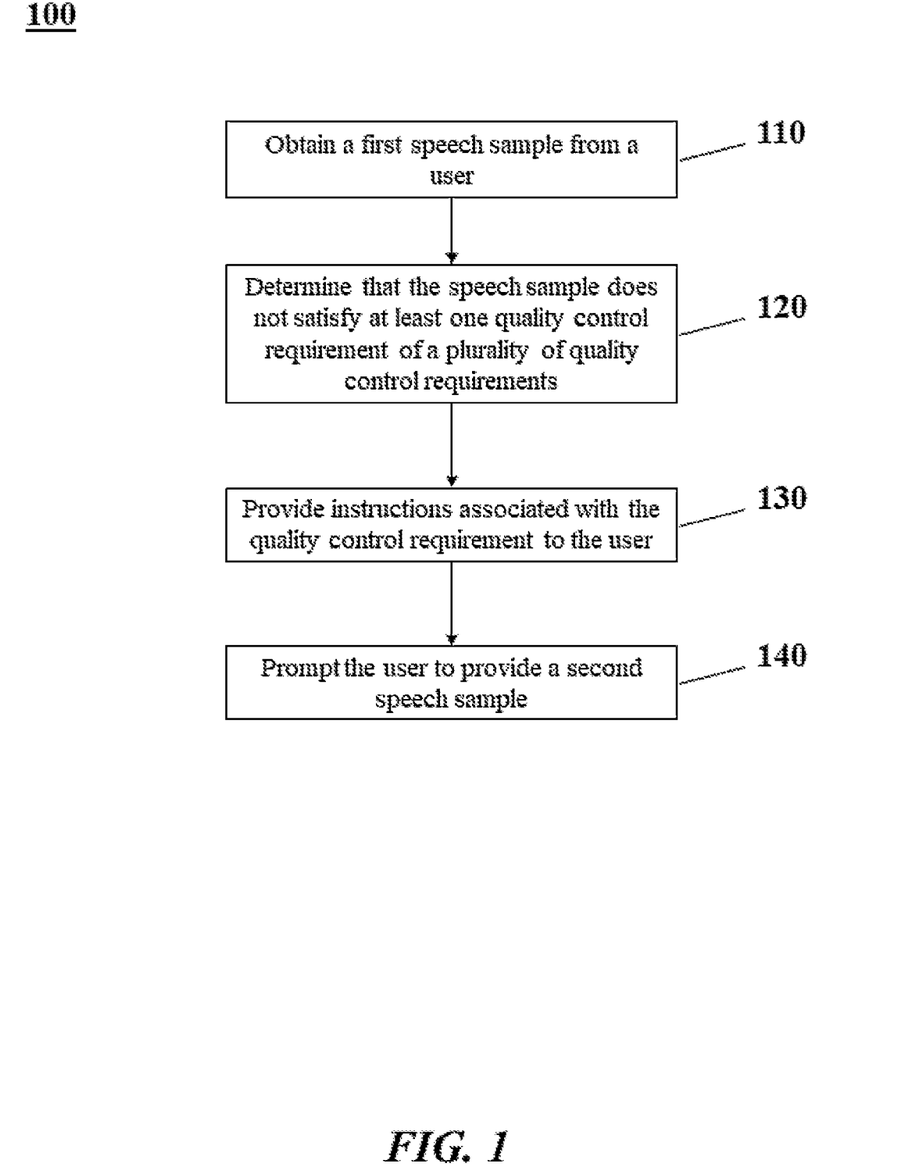
FIG. 1 is a flow chart of a process for quantifying a speech sample, according to an embodiment of the present disclosure.

FIG. 1 is a flow chart of a process 100 for quantifying a speech sample, according to an embodiment. The process 100 can be performed by a system of one or more appropriately programmed computers in one or more locations.

In an operation of the process 100, the system can obtain a first speech sample from a user (110). The first speech sample may be a portion of an automated interview. The automated interview may be an interview performed without the aid of a human operator. For example, the automated interview may involve a user answering questions presented by the system. The automated interview may be an automated telephone interview, an automated online interview, or the like. For example, in one embodiment, the user can use a telephone to connect to the system that conducts the interview. The automated interview may be configured to determine a level of risk of the user. The first speech sample may be encrypted. For example, the first speech sample may be encrypted to reduce a likelihood that the first speech sample is accessible to a non-intended recipient.

The first speech sample may be at least about 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 30, 40, 50, 60, or more seconds long. The first speech sample may be at most about 60, 50, 40, 30, 20, 19, 18, 17, 16, 15, 14, 13, 12, 11, 10, 9.5, 9, 8.5, 8, 7.5, 7, 6.5, 6, 5.5, 5, 4.5, 4, 3.5, 3, 2.5, 2, 1.5, 1, 0.5, or less seconds long. The first speech sample may have a length in a range as defined by any two of the proceeding values. For example, the first speech sample may be about 3-5 seconds long.

In another operation of the process 100, the system can determine that the speech sample does not satisfy at least one quality control requirement of a plurality of quality control requirements (120). The plurality of quality control requirements may comprise a missing response, a vocal volume, a vocal speed, and a presence or absence of background noise. Each requirement of the plurality of quality control requirements may be associated with an instruction. The instruction may indicate that the requirement was not satisfied. The instruction may further indicate how to satisfy the requirement in a second speech sample.

The missing response requirement may require that the speech sample contain responsive speech. For example, if the user does not recite a response after being prompted to, the speech sample may not satisfy the missing response requirement. In another example, if a user provides a proper response to a question, and the response is recorded in the first speech sample, the missing response requirement may be met and the user may not be asked to provide an additional speech sample. The missing response requirement may not be met by a response that does not comprise a predetermined response. For example, a user responding "maybe" to a question with predetermined response options of "yes" or "no" may not meet the missing response requirement.

The instruction associated with the missing response requirement may comprise an indication to the user that the response was not detected in the first speech sample. For example, the system can tell the user "The answer was not detected" in response to providing a first speech sample in which an answer was not detected. The instruction associated with the missing response requirement may comprise an indication of the acceptable answers for the first speech sample. For example, in a yes or no question, the instruction may comprise "The system did not hear all of your responses. Please make sure you answer all of the questions with either a yes or no."

The vocal volume requirement may comprise a requirement that a response submitted in the first speech sample of the user have a volume above a maximum value and/or a volume below a minimum value. The maximum and/or minimum value of the volume signal may be at least about −90, −80, −70, −60, −55, −50, −45, −40, −35, −30, −25, −20, −15, −10, −5, 0, 5, 10, 15, 20, or more decibels. The maximum and/or minimum value of the volume signal may be at most about 20, 15, 10, 5, 0, −5, −10, −15, −20, −25, −30, −35, −40, −45, −50, −55, −60, −70, −80, −90, or fewer decibels. The maximum and/or minimum value of the volume signal may be in a range as bounded by any two of the proceeding values. For example, the minimum to maximum range of the volume signal may be from about −35 decibels to about −10 decibels. In this example, a speech sample in which the user speaks at a peak signal value of −45 decibels may not satisfy the minimum vocal volume requirement.

The instruction associated with the vocal volume requirement may comprise an indication to the user that the response was too loud or too soft. For example, the system can tell the user "The answer was too quiet" if the user's first speech sample or a portion thereof had a volume below the minimum threshold. In this example, the threshold limit may be about −35 decibels. In another example, the system can tell the user "The answer was too loud" if the user's first speech sample or a portion thereof had a volume above the maximum threshold. In this example, the threshold limit may be about −10 decibels. The indication may comprise an indication of the degree to which the user is to change the volume of the response. For example, the indication can indicate that the user can double the volume of their response. In another example, the indication can comprise the phrase "The system was not able to hear all of your responses. Please speak louder when you respond yes or no when the questions are asked again" for an instance where the user did not provide a loud enough response. In another example, the indication may comprise the phrase "Your responses were too loud. Please answer each question in a normal speaking volume when the questions are asked again" in an instance where the user's response was too loud.

The speed requirement may comprise a requirement that the first speech sample have a predetermined length and/or be submitted within a predetermined time after a prompt. For example, a speech sample may fail the speed requirement when a user provides an answer that is too short in duration. In another example, a speech sample may fail the speed requirement when the answer in the speech sample is provided too late in the sample. The speed requirement may be a requirement that a response be at least about 0.05, 0.06, 0.07, 0.08, 0.09, 0.1, 0.2, 0.3, 0.4, 0.5, 0.6, 0.7, 0.8, 0.9, 1, or more seconds long. The speed requirement may be a requirement that a response be at most about 1, 0.9, 0.8, 0.7, 0.6, 0.5, 0.4, 0.3, 0.2, 0.1, 0.09, 0.08, 0.07, 0.06, 0.05, or less seconds long. The speed requirement may be a requirement that a response be within a range as defined by any two of the proceeding values. The speed requirement may be a requirement that an answer be provided within at least about 0.1, 0.5, 1, 2, 3, 4, 5, 6, 7, 8, 9, 10, or more seconds from prompting the user to answer. The speed requirement may be a requirement that an answer be provided within at most about 10, 9, 8, 7, 6, 5, 4, 3, 2, 1, 0.5, or less seconds from prompting the user to answer. The speed requirement may be a requirement that an answer be provided within a range as defined by any two of the proceeding values. The speed requirement may be related to an average speaking rate. For example, the speed requirement may be related to the average speaking rate of a user of a particular language. The speed requirement may be different for different languages.

The instruction associated with the speed requirement may comprise an indication to the user that the response was received too quickly or too slowly in the first speech sample. For example, a user who begins responding prior to the finish of the question may be told that they are answering the questions too quickly. The instruction associated with the speed requirement may comprise an indication to the user that the response was received too late after the user was prompted to respond. For example, a user who waits too long to respond to a question can be told to respond closer to the prompt. In another example, the instruction can comprise the phrase "You are answering the question too quickly. Please answer each question with a yes or no at a normal speaking rate when the questions are asked again" for a user who answered a question too quickly. In another example, the instruction can comprise "You did not answer all the questions immediately after the tone. When the questions are asked again, please answer all questions with either a yes or no immediately after you hear the following tone (play tone marker)" for a user who answered a question too slowly.

The background noise requirement may comprise a requirement that a level of background noise be at or below a predetermined level. The background noise requirement may comprise a requirement that a level of background noise be at or above a predetermined level. The absence of background noise may provide for higher quality speech samples in which the signal from a user's voice is distinguishable from the background. The presence of background noise may be used to determine that a response is a live response and was not pre-recorded. The background noise requirement may not be satisfied if a level of background noise is more than about −90, −80, −70, −60, −55, −50, −45, −40, −35, −30, −25, −20, −15, −10, −5, 0, 5, 10, 15, 20, or more decibels. The background noise requirement may not be satisfied if a level of background noise is at most about 20, 15, 10, 5, 0, −5, −10, −15, −20, −25, −30, −35, −40, −45, −50, −55, −60, −70, −80, −90, or fewer decibels. For example, the background noise requirement may require a background noise of less than about −50 decibels.

The instruction associated with the background noise requirement may comprise an indication to the user to adjust the user's surroundings to minimize background noise. For example, the indication can inform the user to move to a quieter location. The indication may comprise an instruction to the user to notify an interviewer of the user's situation. For example, the user can be prompted to inform an interviewer of the reason for the high background noise level. In this example, the interviewer can utilize this information to model and reduce the background noise coming from the identified source. In another example, the instruction may comprise "The system detected unknown background sounds during the interview. If the location you are taking the interview from is noisy, please advise the Interview Supervisor. Otherwise, please continue the interview and answer each question with either a yes or no when the questions are asked again" for a user who had too much background noise in their speech sample.

Each requirement of the plurality of quality control requirements may be associated with a different priority rating. The priority rating may be an indication of the importance of correcting a given requirement. For example, a requirement with a higher priority rating may be of a greater importance to fix than a quality control requirement of a lower priority rating. The priority rating may be dynamic. For example, the priority rating may change over time and for different speech samples. In this example, as a speech analysis program develops, the priorities may change as the program changes weights of various factors. The priority rating may be fixed. For example, the priority rating may be set and remain unchanged.

When the first speech sample does not satisfy two or more quality control requirements, the quality control requirement with the highest priority may be prioritized over a quality control requirement with a lower priority. The prioritization may comprise providing the instructions associated with the higher priority quality control requirement. For example, if a first quality control requirement with a priority of 1 (e.g., highest priority) and a second quality control requirement with a priority of 2 (e.g., a lower priority than the first quality control requirement) are not satisfied in a first speech sample, the instructions associated with the first quality control requirement can be provided to the user while the instructions associated with the second quality control requirement may not be provided to the user. The quality control requirements may be prioritized by the effect each has on the ability of a vocal processing algorithm to process the speech sample. For example, a higher priority quality control requirement may be higher priority because it has a larger impact on the efficacy of a vocal processing algorithm. In this example, a missing response can have a higher priority than too much background noise, as a missing response cannot be analyzed at all while a response with too much background noise has the ability to be processed. The quality control requirements may be prioritized by ease of addressing the requirement. For example, vocal volume can be higher priority than background noise, as a user may have the ability to adjust the volume of their voice but be unable to remove themselves from a location with high background noise. The quality control requirements may be prioritized in different ways for different users. For example, a user performing the interview at an industrial plant may have a lower priority background noise requirement than a user performing the interview at an office. A non-limiting example of a priority rating of quality control requirements, from highest to lowest, may be a missing response, too low of vocal volume, too fast of a response, to slow of a response, too loud of a response, and a presence of background noise. Another example of a priority rating of quality control requirements, from highest to lowest, may be too low of vocal volume, to loud of a response, too fast of a response, to slow of a response, a presence of background noise, and a missing response. The priority rating may be any other order.

The determining may be performed in real time (e.g., simultaneously or substantially simultaneously to the obtaining the first speech sample). For example, the determining can be performed as the first speech sample is obtained from the user. In this example, as soon as the user is finished providing the first speech sample, the determining may be complete. The determining may be performed with at least about 0.01, 0.05, 0.1, 0.5, 1, 2, 3, 4, 5, or more seconds from receipt of the first speech sample. The determining may be performed within at most about 5, 4, 3, 2, 1, 0.5, 0.1, 0.05, 0.01, or fewer seconds from receipt of the first speech sample. The determining may be performed within the duration of an interview. For example, the determining can be completed before the end of an interview in which the first speech sample is obtained from the user.

If the system determines that the first speech sample satisfies each quality control requirement of the plurality of quality control requirements, the system can skip subsequent operations of the process 100. For example, the method may stop after collection of the first speech sample if all of the quality control requirements are met. When the first speech sample is determined to satisfy the at least one quality control requirement, the process 100 may terminate at operation 120. For example, the process can be terminated once enough speech samples are obtained that satisfy at least one quality control requirement.

In another operation of the process 100, the system can provide the instructions associated with the quality control requirements to the user (130). The instructions may be as described elsewhere herein. Providing the instructions may comprise providing an auditory instruction to the user. For example, the user can be told the instructions through a speaker of a telephone. The providing the instructions may comprise providing a written indication of the instructions to the user. For example, text comprising the instructions can be displayed on a screen to the user. By receiving the instructions, the user may be informed how to provide a higher quality speech sample as compared to the first speech sample. By providing the instructions, the overall quality of speech samples may be higher than without providing the instructions, which can improve the performance of systems that use the speech samples (e.g., vocal processing systems, etc.). By associating the instructions with the quality control requirements, the instructions may be tailored to the specific issues presented in the first speech sample and thus may improve the relevance of the instructions to each user.

In another operation of the process 100, the system can prompt the user to provide a second speech sample (140). The second speech sample may be obtained using a same system as the first speech sample. For example, the second speech sample can be acquired by a same microphone as the first speech sample. The second speech sample may be obtained in the same session as the first speech sample. For example, the user can be in the same interview session when the user provides the second speech sample. The second speech sample may be obtained subsequent to the session in which the first speech sample was obtained.

The second speech sample may be used as a speech sample in operations 110-130. For example, the second speech sample may be subjected to the determination of if the second speech sample satisfies the at least one quality control requirement. If the second speech sample is determined to satisfy the at least one quality control requirement, the second speech sample may be further processed. When the first speech sample is determined not to satisfy the one or more quality control requirements, but the second speech sample is determined to satisfy the one or more quality control requirements, the second speech sample may be used in place of the first speech sample. For example, the first speech sample can be discarded and not used for a vocal processing algorithm while the second speech sample may be used for the algorithm. Alternatively, when both the first and second speech samples are determined not to satisfy the at least one quality control requirement, both the first and second speech samples may be discarded.

Any number of operations 110-140 may be repeated one or more times to generate one or more additional speech samples. The operations may be repeated at least about 1, 2, 3, 4, 5, 6, 7, 8, 9, 10, or more times. The operations may be repeated at most about 10, 9, 8, 7, 6, 5, 4, 3, 2, or less times. For example, the operations may be repeated at most 2 times resulting in at most 3 speech samples. Each of the one or more additional speech samples may be processed to determine if each speech sample satisfies the at least one quality control requirement. Each speech sample of the one or more additional speech samples that does not satisfy the at least one quality control requirement may be discarded.

In another aspect, the present disclosure provides a system. The system may comprise one or more computer processors operatively coupled to computer memory. The one or more computer processors may be individually or collectively configured to determine that a first speech sample of a user does not satisfy at least one quality control requirement of a plurality of quality control requirements. The plurality of quality control requirements may comprise a missing response, a vocal volume, a vocal speed, and a presence or absence of background noise. Each quality control requirement of the plurality of quality control requirements may be associated with instructions. The instructions may indicate that the quality control requirement was not satisfied. The instructions may indicate how to satisfy the quality control requirement in a second speech sample. The instruction associated with the quality control requirement may be provided to the user. The user may be prompted to provide the second speech sample.

Figure 2:
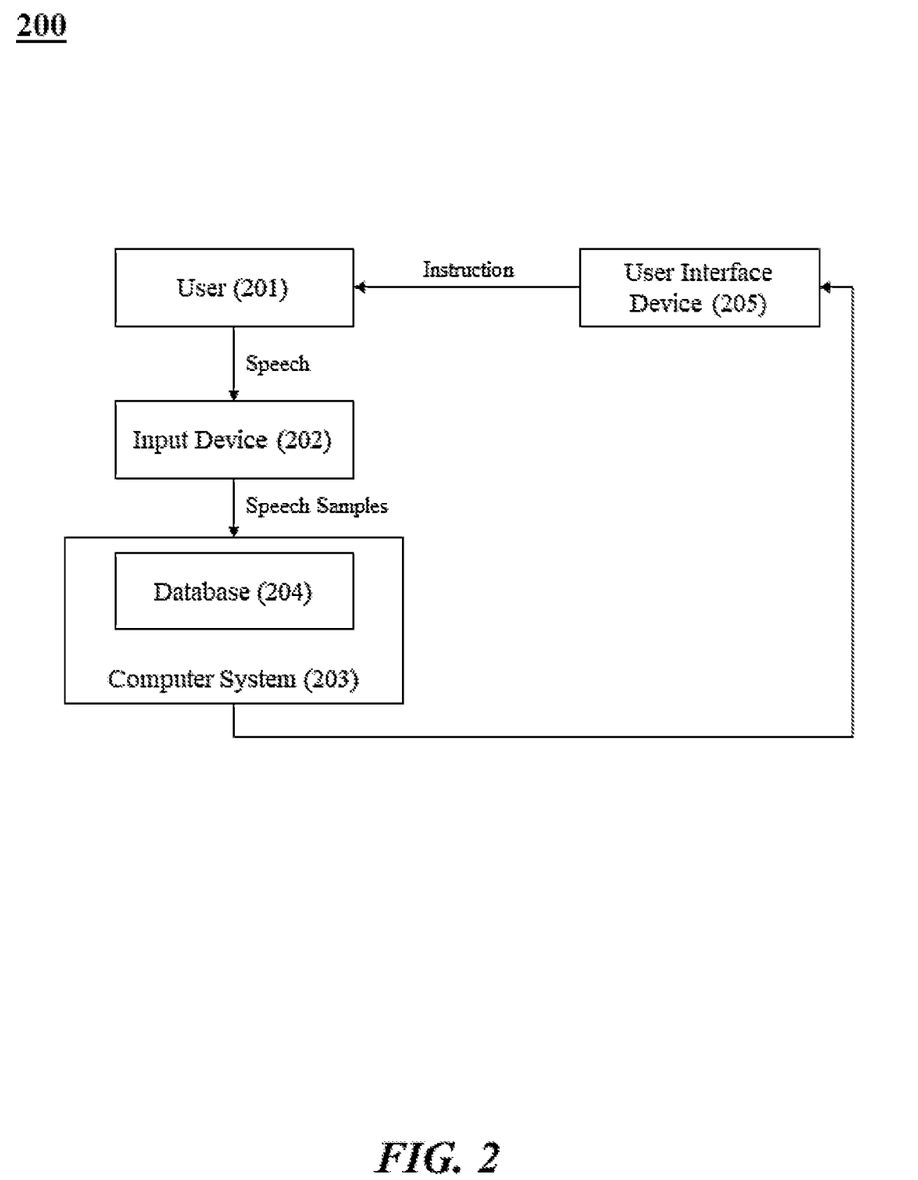
FIG. 2 is a schematic diagram of a system, according to an embodiment of the present disclosure.

FIG. 2 is a schematic diagram of a system 200. The user 201 may provide a speech sample to an input device 202. The user may be a person taking an interview (e.g., a person answering questions, an applicant to a job, a person under evaluation, etc.). The speech sample may comprise one or more words answering a question provided to the user. For example, the user can receive an audio question from a user interface device 205. The speech sample may be a single word. For example, the speech sample can be "yes" or "no." The input device 202 may comprise a microphone. Examples of input devices include, but are not limited to, telephones (e.g., smartphones, landline phones, etc.), computers (e.g., a laptop comprising a microphone, a desktop computer, etc.), electronic devices (e.g., a tablet, a personal digital assistant, an electronic kiosk, etc.), a microphone coupled to a recorder, or the like, or any combination thereof. For example, the user can use their smartphone to input the speech samples. In this example, the speech sample may be recorded by a system external to the smartphone (e.g., a cloud server). In some cases, the smartphone may record the speech sample for later transmission to an external system.

The input device may be coupled to a computer system 203. The computer system 203 may be local to the input device (e.g., the input device is physically attached to the computer system). The computer system may be remote from the input device and/or the user (e.g., the computer system is a remote server). The computer system may be a cloud computer system (e.g., remote to the user). The computer system may be coupled to the input device via the internet. The computer system may be coupled to the input device over a local connection. The speech samples may be encrypted. The computer system may comprise one or more processors configured to process the speech samples. An example of processing is determining if the speech samples satisfy one or more quality control requirements. The computer system may be configured to store the results of the determining on a database 204. The computer system may be configured to provide instruction to the user related to the speech samples via the user interface device 205. The instructions may comprise auditory instructions (e.g., spoken instructions), text instructions (e.g., text displayed on a screen for the user), or the like, or any combination thereof. Examples of user interface devices include, but are not limited to, telephones (e.g., smartphones, landline phones, etc.), computers (e.g., a laptop comprising a microphone, a desktop computer, etc.), electronic devices (e.g., a tablet, a personal digital assistant, an electronic kiosk, etc.), a microphone coupled to a recorder, or the like, or any combination thereof. For example, the computer system can provide instructions to the user via a speaker within the user's telephone. In another example, the computer system can display the instructions on a screen in front of the user.

Remote Risk Assessment System

Figure 6:
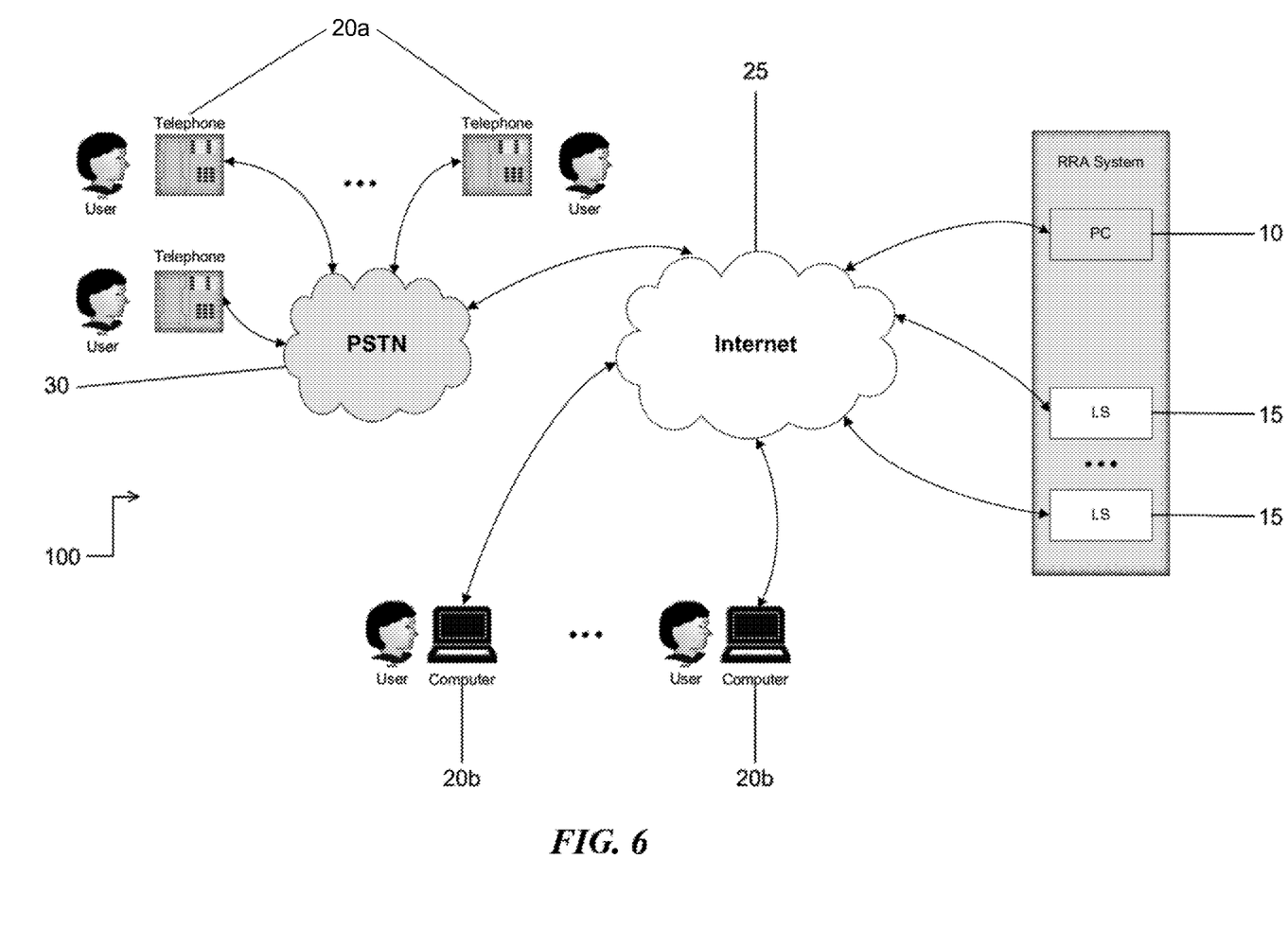
FIG. 6 shows a schematic of a Remote Risk Assessment system (RRA) and communication network, according to some embodiments of the present disclosure.

Referring to FIG. 6, a Remote Risk Assessment ("RRA") system in accordance with some embodiments of the present disclosure is shown. In some applications, the RRA system 100 may include a homogeneous, distributed computing and communication network that may include, for example, a processing center ("PC") 10 and one or more full-function local server ("LS") nodes 15. When more than one LS node 15 is included in the system 100, the nodes 15 may be organized in a hierarchical network. The elements of the system 100 may be hardwired in a network or may include mobile (communication) components that can operate autonomously, communicating and transferring data intermittently, e.g., wirelessly.

Although FIG. 6 shows a single PC 10, the number and type of LS nodes 15 may vary depending on the number and physical (geographic) location of risk assessment or other interviews being simultaneously conducted, as well as other administrative requirements. The PC 10 and each LS node 15 may have its own IP address and may be structured and arranged to manage its own data, as well as to handle data from related systems and other LS nodes 15.

In some variations, one or more interview terminals 20 *a*, 20 *b* may be in communication with one or more LS nodes 15, directly, via a communication network (e.g., the Internet 25), and/or via a public switched telephone network (PSTN) 30. Interview terminals may include (landline) telephones 20 *a*, modular phones, cellphones, iPhones, softphones, computers 20 *b*, as well as other mobile voice communication and processing devices. Although FIG. 6 shows that the PSTN 30 communicates with the LS nodes 15 through the Internet 25, in some implementations, the PSTN 30 may communicate directly with the LS nodes 15, outside of the Internet 25.

Given that the quality of communication across the globe may be distributed unevenly, substantially all implementations of the RRA system 100 may be characterized by an average distance between an interview terminal 20 *a*, 20 *b* to an LS node 15. Based on distance, all or some portion of the RRA system 100 may be classified as: a mobile system (distances up to about 100 m, which corresponds to the maximum effective range of a CAT 7 Ethernet), a local corporate system (distances up to about 10 km), a local government system (distance up to about 1000 km), and a global system (distance up to about 20,000 km). Local and global systems may be stationary networks that work, predominantly, in an on-line mode. During emergency conditions, local and global systems may operate temporarily on an off-line basis until the cause of the emergency has been rectified. In contrast, mobile systems may operate in an off-line mode, which may require on-line access and communication with an LS node 15 sporadically, for example, when data is to be transmitted and/or to receive the results of an interview. Advantageously, even in an extreme case in which there is no electrical power and/or no telecommunication, the RRA system 100 may operate effectively via mobile, self-powered devices.

In order to join an interview with a service interview, communication between an interview terminal 20 *a*, 20 *b* and an LS node 15 can be established, e.g., using or via the node's "Clients" module. For example, a (landline) telephone 20 *a* may establish communication with an LS node 15 via a PSTN 30 using a telephone number either to a call center or directly to the LS node 15 itself iPhones and/or cellphones may establish communication with an LS node 15 via a WAN or a LAN network. In some variations, previous registration and entry of an access parameter may be required to facilitate establishing the communication. Access parameters may include, for the purpose of illustration and not limitation, one or more of: a password, a port number, the IP address of the node, and/or a conditional service number. SKYPE and other on-line methods of communicating using a computer or processing device 20 *b* may establish communication with an LS node 15 via a connection through one or more WAN and a PSTN 30, e.g., using a telephone number either to a call center or directly to the LS node 15 itself.

The LS nodes 15 may be configured according to modular principles. Between the lowest level and the top of the network, any LS node 15 may be connected to a host node and may itself be a host node at the same time. Thus, the RRA system 100 may be hierarchical, such that all LS nodes 15 in a particular level are associated with adjacent LS nodes 15 in the same level; but, that each LS node 15 is associated with a discrete LS node 15 at a top or upper level.

In some implementations, RRA system topology may display a territorial and/or administrative division of a (geographic) region for collecting interview data. Dimension and topology of the RRA system 100 may also correspond to an actual workload, as well as to geographic requirements.

Although each LS node 15 may operate independently from other LS nodes 15, LS nodes 15 may be in communication with other LS nodes 15 as well as with the PC 10, taking into account the peculiarities of organization procedures for, for example, conducting interviews and so forth.

Each LS node 15 or, collectively, some plurality of the LS nodes 15 may be adapted to perform one or more of: accept incoming calls and provide information about the system 100; support a dialogue with persons/clients in an unattended mode (e.g., without a human operator) in a plurality of foreign languages; reproduce interview questions and record answers; transfer recorded responses to interview questions to other LS nodes 15 (e.g., in an automatic or manual mode) and receive the processing results; generate reports on interview results; and conduct multiple interviews simultaneously and independently.

Security

Security of the RRA system 100 may be ensured, for example, by a choice of systemic remedies (e.g., secure data transfer protocols) and/or by developing applied methods of protection (e.g., encryption of sensitive data).

The primary source of information in the RRA system 100 may be a recorded interview that may include, for example, an audio and/or video record of the response(s) of an interviewed person or client to a plurality of questions posed to the person/client during the interview. In order to ensure that the recorded information is not available to others outside of the system 100, the information may be encrypted, which may include both the files containing the person/client's response(s) as well as the results of processing (e.g., of interview results).

Interviews and Service Interviews

An interview may refer to a set of questions that are intended to be asked to a person or client, as well as to an event or the event during which those questions are posed to the person/client (e.g., by an operator or supervisor). In contrast, a service interview may refer to a risk assessment conducted or evaluated, e.g., by a supervisor, based on data collected (e.g., the person/client's responses) during an interview. The interviewed person/client/user may be located remotely from the supervisor performing the service interview. Although the interview and the service interview may be conducted simultaneously or substantially simultaneously, in many implementations, data collected during the interview may be recorded and transmitted remotely from the sites of the interview for later review during the service interview.

Advantageously, the RRA system 100 may implement the preliminary interview manually, automatically, or by a combination of the two. For example, in the manual mode, a trained operator or supervisor may ask the person/client/user a number of questions from a list of interview qualification questions, the answers of which may be used to assess the person/client/user's status and likelihood of successfully completing a standard interview. In an automatic mode, the system 100 may perform the same functions as the human actor in the manual mode. In a combined mode, the system 100 may perform the same functions; however, the supervisor may make an ultimate decision as to the readiness of the person/client for a standard interview. The automatic and combined modes may produce an automatic analysis of the person/client's response in the preliminary interview in real time. For example, the person/client's responses may be recognized, and the verbal responses evaluated. If any of the responses are flagged as posing a risk, further interviewing may be considered inappropriate.

In some embodiments, the RRA system 100 may implement the standard interview automatically. For example, in automatic mode, the RRA system 100 may ask the person/client questions using TTS (text-to-speech technology) or the voice of an announcer. Responses may be analyzed immediately in real time or responses, often, may be recorded and recorded data provided to the supervisor on-line, e.g., via the communication network, off-line, e.g., via a PSTN 30, or manually at a later date and time.

One of the many advantages of the present system may be that special sensors (e.g., biometric devices for detecting bodily reactions of the person/client) are not necessary. Indeed, some implementations, recording and/or transmission of interviews may be accomplished using a public switched telephone network (PSTN) 30 or directly over the Internet 25, e.g., using a computer 20 b, iPhone, and the like. In some embodiments, the interview may be conducted using mobile and non-mobile communication devices, e.g., directly from a local area network (LAN) of the system 100, e.g., using computer terminals 20 b, iPhones, and the like, and/or remotely via a global computer network (e.g., a wide area network (WAN)) of a public switched telephone network (PSTN) 30.

Risk Appraisal

During a preliminary or a standard interview, a first party may ask questions. In response to the posed question, a second party may answer the question, may choose not to answer the question (e.g., either by remaining silent or by positively expressing that he/she will not answer the question), or may be evasive in his/her answer to the question. The first party, or interviewer, may define the subject matter of the interview and may formulate the questions. The interviewer may be interested in not only receiving clear answers to the interview questions but also receiving answers that the interviewer has a high level of confidence are accurate. The second party, or interviewee, in many instances may be subject to some external force(s) that encourages him/her to answer the questions posed, hence, he/she may try to respond to the questions in a manner most beneficial to his/her personal interests. As a result, there may be some level of uncertainty in accepting the individual responses of the interviewee or any response of the interviewee.

For example, in some embodiments, a series of questions for which a short (yes or no) answer may be formed. The response duration for these short questions may range between about 0.1 and 0.5 seconds. As a result, the response may be associated directly with the content of the question asked.

In another aspect, the present disclosure provides one or more non-transitory computer storage media storing instructions that are operable, when executed by one or more computers, to cause the one or more computers to perform operations. The operations may comprise obtaining a first speech sample from a user. The speech sample may be determined to not satisfy at least one quality control requirement of a plurality of quality control requirements. The plurality of quality control requirements may comprise a missing response, a vocal volume, a vocal speed, and a presence or absence of background noise. Each quality control requirement of the plurality of quality control requirements may be associated with instructions. The instructions may indicate that the quality control requirement was not satisfied. The instructions may indicate how to satisfy the quality control requirement in a second speech sample. The instruction associated with the quality control requirement may be provided to the user. The user may be prompted to provide the second speech sample.

The following examples are illustrative of certain systems and methods described herein and are not intended to be limiting.

Example 1—Performing Quality Control of Audio Interviews

Figure 3:
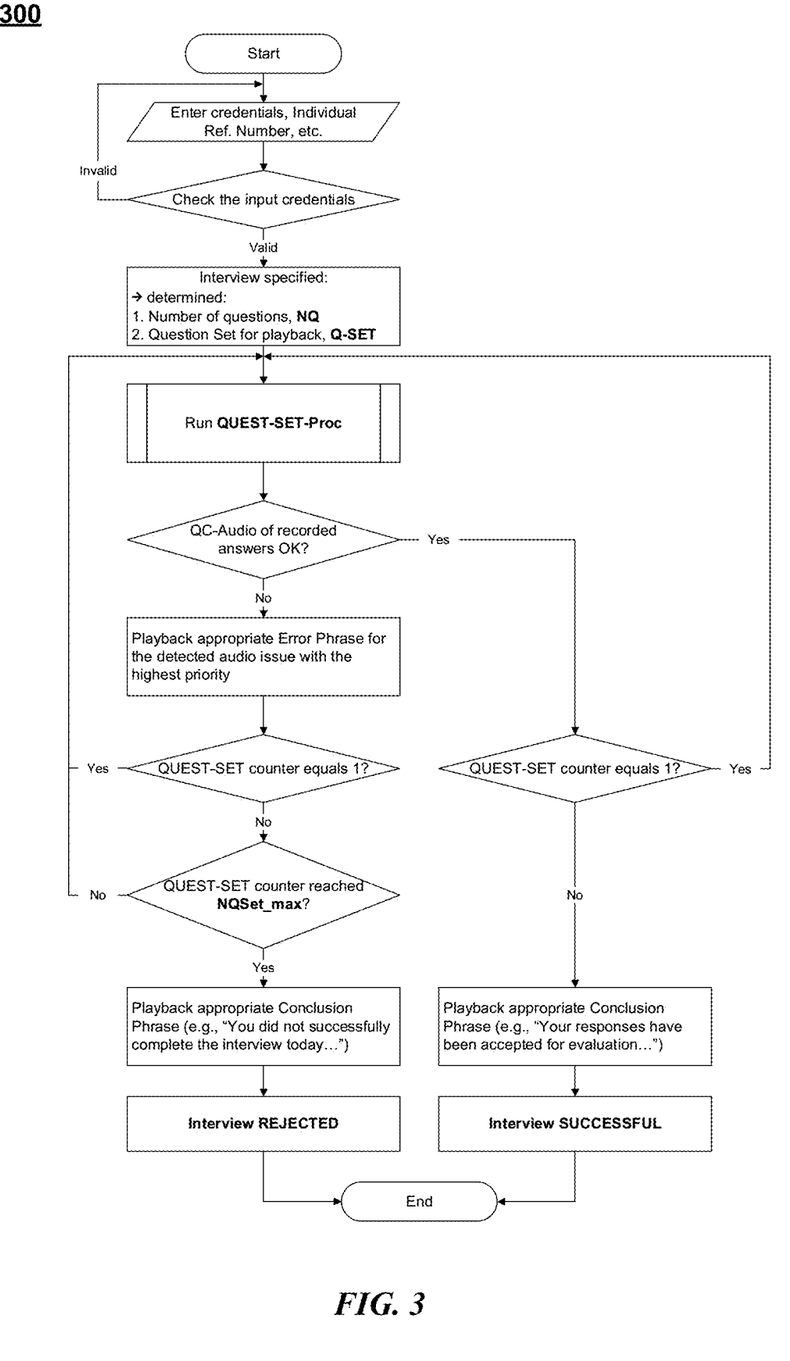
FIG. 3 is a flow chart of a process for providing quality control of one or more speech samples according to an embodiment of the present disclosure.

FIG. 3 is a flow chart of a process for conducting an automated interview of a user, according to an embodiment. The process can be performed by a system of one or more computers in one or more locations (e.g., the system 203 of FIG. 2). The user can begin the interview by dialing a phone number or visiting a website. The act of dialing the phone number or visiting the website may cause the system to initiate an automated conversation with the user. In a first operation, the system can prompt the user to provide one or more credentials. Examples of credentials include reference numbers, identification numbers, passwords, or the like. In a second operation, the system can check that the credentials are valid (e.g., that the provided password is the correct password for the provided username). If the credentials are found to not be valid, the system may prompt the user again to enter credentials. Failing to provide correct credentials a number of times may result in a user being barred from further attempts to do so. Each user may have a different interview. For example, different users can receive different questions as a part of their interview. Each user may have different credentials for accessing their interview. For example, a first credential can correspond to a first user, while a second credential can be used by a second user to access their interview. The parameters of the interview may be different for different users. Examples of parameters include the number of questions NQ, the question set used for playback Q-SET, the number of repetitions allowed for the questions NQSet_max, or the like.

Figure 4:
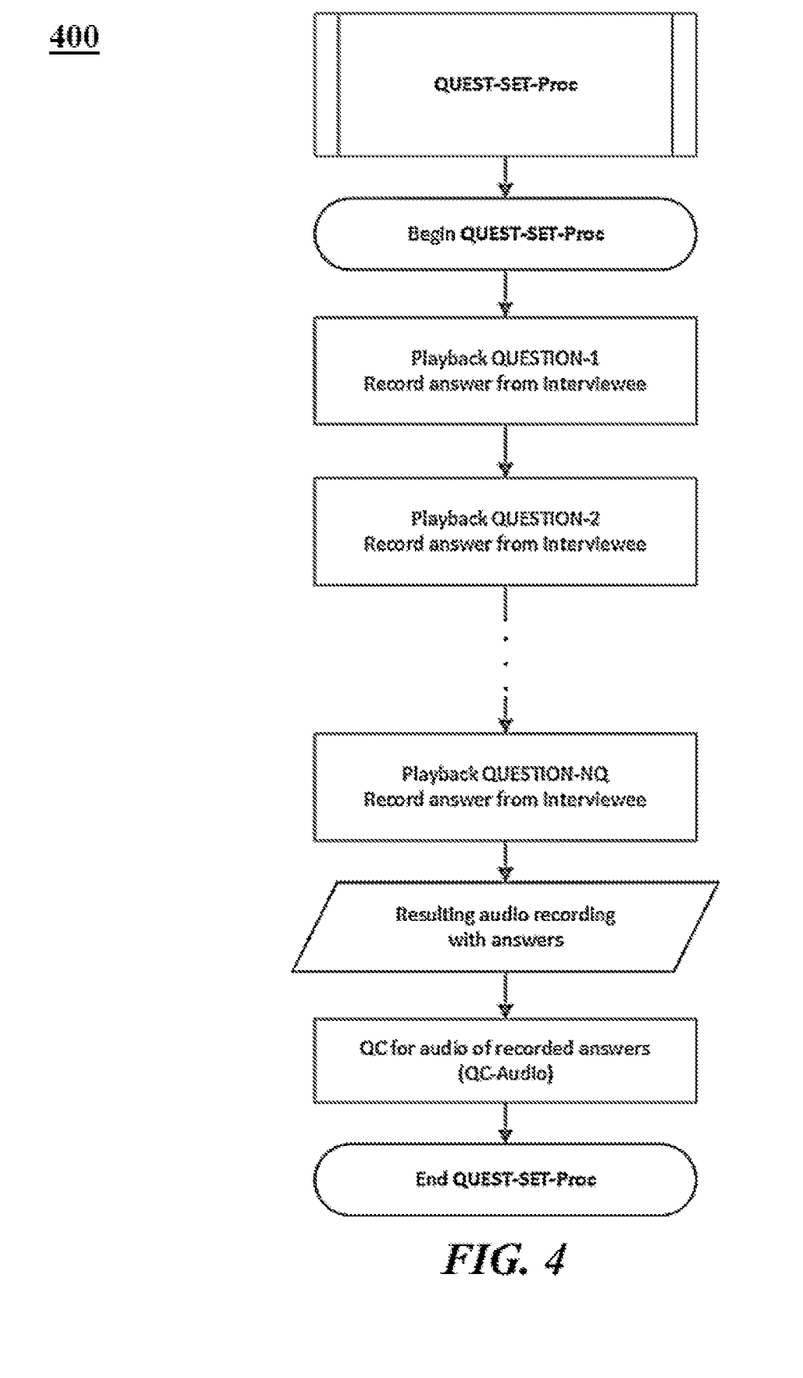
FIG. 4 is a flow chart of a process QUEST-SET-Proc, according to an embodiment of the present disclosure.

Once the user is permitted to participate in the interview, the user may begin the process QUEST-SET-Proc as shown in FIG. 4. Upon completion of QUEST-SET-Proc, the system can process the obtained speech samples to determine if they do not satisfy at least one quality control requirement. If so, the system can repeat QUEST-SET-Proc until a predetermined number of speech samples that satisfy all of the at least one quality control requirement are obtained, at which point the user may be notified that the interview was completed successfully and the interview may be terminated.

If the speech sample is not determined to satisfy all of the quality control requirements, the system can play the instruction associated with the highest priority quality control requirement in an attempt to improve the quality of subsequent speech samples. If the number of times QUEST-SET-Proc has been performed is less than the maximum number NQSet_max, the QUEST-SET-Proc process can be repeated in order to attempt to receive speech samples that satisfy all of the quality control requirements. If instead, the maximum number has been reached, the user can be informed that the interview was not satisfactorily completed, and the interview may be terminated.

FIG. 4 is a flow chart of a process QUEST-SET-Proc as shown in FIG. 3. The system can begin the process by playing a question (e.g., QUESTION-1) for the user and recording their response to the question. The process may be repeated for each question in the interview. The answers provided by the users can be used as speech samples as described elsewhere herein. For example, the speech samples can be subjected to operation 120 of FIG. 1 to determine if the speech samples satisfy the at least one quality control requirement. The status of the speech samples can be transferred to the process of FIG. 3, and the results can be used to determine how the interview proceeds (e.g., are the questions repeated, is the interview terminated, etc.).

Computer Systems

Figure 5:
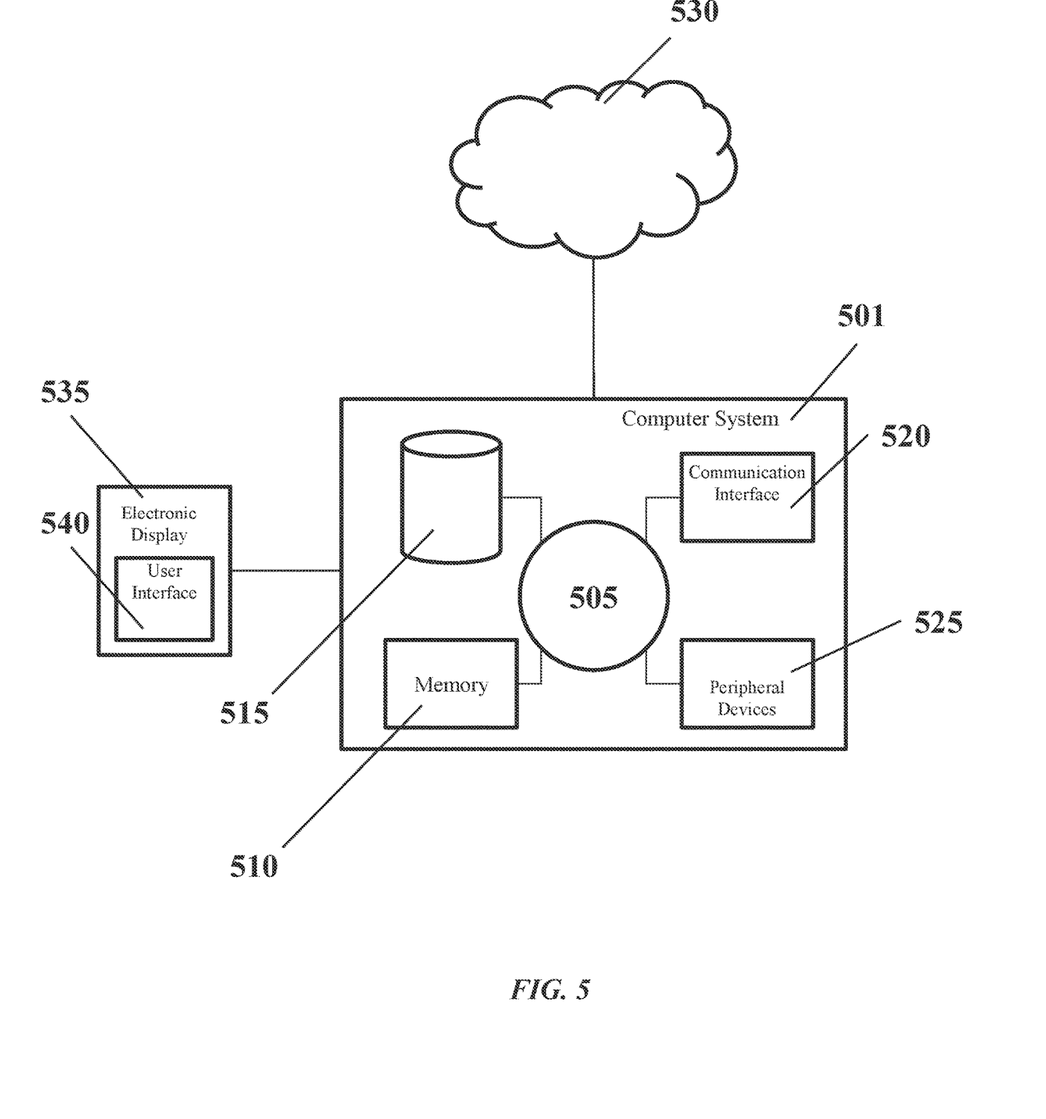
FIG. 5 shows a computer system that is programmed or otherwise configured to implement methods provided herein.

The present disclosure provides computer systems that are programmed to implement methods of the disclosure. FIG. 5 shows a computer system 501 that is programmed or otherwise configured to implement methods as described elsewhere herein. The computer system 501 can regulate various aspects of the present disclosure, such as, for example, the process 100 of FIG. 1. The computer system 501 can be an electronic device of a user or a computer system that is remotely located with respect to the electronic device. The electronic device can be a mobile electronic device.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. The instructions can be directed to the CPU 505, which can subsequently program or otherwise configure the CPU 505 to implement methods of the present disclosure. Examples of operations performed by the CPU 505 can include fetch, decode, execute, and writeback.

The CPU 505 can be part of a circuit, such as an integrated circuit. One or more other components of the system 501 can be included in the circuit. In some cases, the circuit is an application specific integrated circuit (ASIC).

The storage unit 515 can store files, such as drivers, libraries, and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems through the network 530. For instance, the computer system 501 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine-readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display 535 that comprises a user interface (UI) 540 for providing, for example, indications associated with a quality control requirement. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 505. The algorithm can, for example, perform determinations on speech samples as described elsewhere herein.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A computer-implemented method, comprising:
    (a) obtaining a first speech sample from a user;
    (b) determining that said first speech sample does not satisfy at least one quality control requirement of a plurality of quality control requirements selected from the group consisting of a missing response, a vocal volume, a vocal speed, a speech duration, a speech timeliness, and a presence or absence of background noise, wherein each quality control requirement of said plurality of quality control requirements is associated with a different ordered priority rating relative to other quality control requirements of said plurality of quality control requirements, and wherein each quality control requirement of said plurality of quality control requirements is associated with an instruction that indicates:
        (i) that said at least one quality control requirement was not satisfied, and
        (ii) how to satisfy said at least one quality control requirement in a second speech sample;
    (c) determining that said first speech sample does not satisfy a single quality control requirement from among said at least one quality control requirement having a highest priority rating;
    (d) providing only said instruction associated with said single quality control requirement to said user, without providing instructions associated with other quality control requirements of said plurality of quality control requirements having lower priority ratings; and
    (e) prompting said user to provide said second speech sample.

2. The method of claim 1, wherein said plurality of quality control requirements have an ordered priority rating, from highest to lowest, of a missing response, a vocal volume that is too low, a vocal speed that is too fast, a vocal speed that is too slow, a vocal volume that is too loud, and a presence of background noise.

3. The method of claim 1, further comprising repeating (a) to (e) to prompt said user to provide a third speech sample.

4. The method of claim 3, further comprising repeating (a) to (e) fewer than three times.

5. The method of claim 1, further comprising repeating (a) to (d) for said second speech sample.

6. The method of claim 5, further comprising discarding said second speech sample, responsive to determining that said second speech sample does not satisfy said at least one quality control requirement.

7. The method of claim 1, wherein said first speech sample is at least a portion of an automated interview.

8. The method of claim 7, wherein said automated interview comprises an automated telephone interview.

9. The method of claim 7, wherein said automated interview is configured to determine a level of risk of said user.

10. The method of claim 1, further comprising obtaining said second speech sample from said user, and determining that said second speech sample satisfies said at least one quality control requirement.

11. The method of claim 1, wherein (b) is performed in real-time.

12. The method of claim 1, wherein (d) further comprises providing an auditory instruction to said user.

13. The method of claim 1, wherein said first speech sample has a length of less than 5 seconds.

14. The method of claim 10, further comprising determining that said second speech sample satisfies each quality control requirement of said plurality of quality control requirements.

15. The method of claim 1, wherein said plurality of quality control requirements have an ordered priority rating, from highest to lowest, a vocal volume that is too low, a vocal volume that is too loud, a vocal speed that is too fast, a vocal speed that is too slow, a presence of background noise, and a missing response.

16. The method of claim 1, wherein (d) further comprises providing a text instruction to said user.

17. The method of claim 11, wherein (b) is performed within at most about 5 seconds from said obtaining in (a).

18. A computer-implemented system, comprising:
one or more computer processors, and a computer memory operatively coupled thereto, wherein said one or more computer processors are individually or collectively programmed to:
(a) obtain a first speech sample from a user;
(b) determine that said first speech sample does not satisfy at least one quality control requirement of a plurality of quality control requirements selected from the group consisting of a missing response, a vocal volume, a vocal speed, a speech duration, a speech timeliness, and a presence or absence of background noise, wherein each quality control requirement of said plurality of quality control requirements is associated with a different ordered priority rating relative to other quality control requirements of said plurality of quality control requirements, and wherein each quality control requirement of said plurality of quality control requirements is associated with an instruction that indicates:
 (i) that said at least one quality control requirement was not satisfied, and
 (ii) how to satisfy said at least one quality control requirement in a second speech sample;
(c) determine that said first speech sample does not satisfy a single quality control requirement from among said at least one quality control requirement having a highest priority rating;
(d) provide only said instruction associated with said single quality control requirement to said user, without providing instructions associated with other quality control requirements of said plurality of quality control requirements having lower priority ratings; and
(e) prompt said user to provide said second speech sample.

19. A non-transitory computer-readable storage medium storing instructions that are operable, when executed by one or more computers, to cause said one or more computers to perform operations comprising:
(a) obtaining a first speech sample from a user;
(b) determining that said first speech sample satisfies at least one quality control requirement of a plurality of quality control requirements selected from the group consisting of a missing response, a vocal volume, a vocal speed, a speech duration, a speech timeliness, and a presence or absence of background noise, wherein each quality control requirement of said plurality of quality control requirements is associated with a different ordered priority rating relative to other quality control requirements of said plurality of quality control requirements, and wherein each quality control requirement of said plurality of quality control requirements is associated with an instruction that indicates:
 (i) that said at least one quality control requirement was not satisfied, and
 (ii) how to satisfy said at least one quality control requirement in a second speech sample;
(c) determining that said first speech sample does not satisfy a single quality control requirement from among said at least one quality control requirement having a highest priority rating;
(d) providing only said instruction associated with said single quality control requirement to said user, without providing instructions associated with other quality control requirements of said plurality of quality control requirements having lower priority ratings; and
(e) prompting said user to provide said second speech sample.

* * * * *